(12) United States Patent
Shirai et al.

(10) Patent No.: US 6,730,403 B1
(45) Date of Patent: May 4, 2004

(54) MAGNETIC RECORDING MEDIUM AND METHOD FOR MANUFACTURING THE SAME

(75) Inventors: Shinji Shirai; Youichi Tei; Takahiro Tokumoto, all of Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/479,285

(22) Filed: Jan. 6, 2000

(30) Foreign Application Priority Data

Jan. 7, 1999 (JP) .......................................... 11-002185

(51) Int. Cl.$^7$ ............................................. G11B 5/725
(52) U.S. Cl. ................................ 428/421; 428/694 TF; 427/131; 508/425; 508/582
(58) Field of Search ........................ 428/694 TF, 421; 427/131; 508/425, 582

(56) References Cited

U.S. PATENT DOCUMENTS

| | | | | |
|---|---|---|---|---|
| 5,128,216 A | * | 7/1992 | Ng ............................ | 428/695 |
| 5,441,655 A | * | 8/1995 | Odello et al. ............... | 252/49.9 |
| 5,587,217 A | * | 12/1996 | Chao et al. ................ | 428/65.4 |

FOREIGN PATENT DOCUMENTS

| | | | | |
|---|---|---|---|---|
| JP | 08319491 | 12/1996 | ........ | C10M/105/50 |
| JP | 09305961 | 11/1997 | ............ | G11B/5/72 |

OTHER PUBLICATIONS

Judy Lin and Anthony Wu, "Lubricants for Magnetic Rigid Disks," p. 599–604, Proceedings of the Jananese International Tribology Conference Nagoya, 1990.

Min Yang, Frank Takle, D.J. Perettie, T.A. Morgan and K.K. Kar, "Environmental Effects on Phosphazene Lubricated Computer Hard Disks," p. 4143–4145, IEEE Transactions on Magnetics, vol. 30, No. 6, Nov. 1994.

\* cited by examiner

*Primary Examiner*—Stevan A. Resan
(74) *Attorney, Agent, or Firm*—Darby & Darby

(57) ABSTRACT

A lubricant for a magnetic recording medium that imparts resistance to degradation, improved lubrication quality and better CSS durability to the medium, even when using a low levitating head. The lubricant is a perfluoropolyether compound having a cyclic triphosphazene end group within the molecule. A magnetic recording medium using at least one perfluoropolyether compound having a cyclic triphosphazene end group within the molecule as a lubricant. A method of making a magnetic recording medium which resists degradation when using a low levitation head including the sequential steps of: forming a foundation layer on a non-magnetic base, forming a magnetic layer on the foundation layer, forming a protection layer on the magnetic layer, and forming a lubrication layer on the protection layer. The lubrication layer includes at least one perfluoropolyether lubricant having a cyclic triphosphazene end group within the molecule.

4 Claims, 1 Drawing Sheet

MAGNETIC RECORDING MEDIUM AND METHOD FOR MANUFACTURING THE SAME

BACKGROUND TO THE INVENTION

The present invention relates to a lubricant for a magnetic recording medium, a magnetic recording medium, and a method for making the magnetic recording medium, used with an external recording device of a computer. In particular, the present invention improves lubrication quality and CSS durability of a magnetic recording medium by coating the surface of the medium with a liquid lubricant.

Recording devices and the like using solid magnetic recording media generally use a contact start stop (CSS) system in which a magnetic head is levitated while the magnetic recording medium is rotating, and when the rotation driving motor is stopped, the magnetic head makes contact with the magnetic recording medium. In the magnetic recording medium of the prior art, diamond-like carbon (DLC) is used as a surface protection film, with a small amount of N or Si and the like. In general, in order to improve the lubrication quality of this surface protection layer, a perfluoropolyether lubricant is coated on top of the surface protection layer, either alone or with a cyclic triphosphazene lubricant. The perfluoropolyether lubricant has a polar end group, such as a hydroxyl group or a piperonyl group. Adsorption of gases and organic contamination onto the surface of the recording media is prevented by completely covering the protection layer surface with this lubricant. Using the lubricant improves lubrication quality and provides a magnetic recording medium that is stable and has excellent CSS durability.

The DLC carbon surface is covered by a thin oxidation film, having a reactive carbonyl, carboxyl, hydroxyl, or other similar functional group. Pollutants are readily adsorbed and bound to this oxidation film. It is desirable to suppress this sorption of contaminants. This can be accomplished by using a perfluoropolyether with a polar end group. However, if the molecular weight of the perfluoropolyether is too low, lubrication quality is reduced. If it is too high, the sorption tendency increases. In general, a perflouropolyether having an average molecular weight of 1,500–5,500 is used. In order to completely cover the protective layer surface using this perfluoropolyether, the lubricant must be at least 50 Å thick. However, when a perfluoropolyether with a relatively large molecular weight is used, coating films only several tens of Å's thick on the protective layer result in there being spaces between molecules, making it difficult to completely cover the protective layer surface. As a result, providing a sufficiently thick coating film, while avoiding attachment between the magnetic recording medium and the magnetic head, becomes difficult.

In recent years, in addition to development of high density recording, advances have been made in development of low levitation magnetic heads. Low levitation heads now being made, such as the Tri-Pad head, the MR head and the like, are gradually replacing the TRC heads of the past. As a result of using low levitation heads, degradation of the main chain area (ether region) of the perfluoropolyether lubricant occurs, due to either catalytic action from the head material or from friction heat generated during use of the recording device. Furthermore, corrosive components, such as degradation products and gases that have been adsorbed to the disk surface, are transferred to the magnetic head surface. This disrupts the levitation quality of the magnetic head, and invites reduction in replay output. Furthermore, once the perfluoropolyether lubricant is degraded, there is a reduction in the lubrication quality, and abrasion in the protection layer occurs. Under the worst case scenario, head crushing can result from such abrasion.

It is known from the prior art that cyclic triphosphazene lubricants improve lubrication quality and have the effect of suppressing the degradation of perfluoropolyether lubricants. For example, Japanese Laid-Open Patent Publication Number 9-305961, discloses a combination of a cyclic triphosphazene lubricant and a perfluoropolyether lubricant. The cyclic triphosphazene lubricant is represented by the structural formula (III) below. When this combination is used, the lubrication quality of the magnetic recording medium is improved.

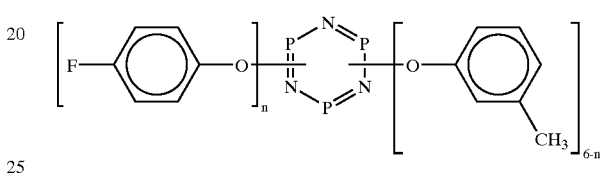

(III)

In formula (III), n is 0 or an integer from 1 to 6.

However, certain problems remain to be solved. For example, perfluoropolyether lubricants and cyclic triphosphazene lubricants are very difficult to mix. When they are used as a lubricating layer film, aggregation can occur under certain conditions. As a result, the quality of the recording device using a fixed magnetic recording medium can be compromised when using the prior art lubricant.

In order to solve the aforementioned problems, various types of perfluoropolyether lubricants have been tried. To date, a technology having a satisfactory overall performance has yet to be achieved.

OBJECT AND SUMMARY OF THE INVENTION

In light of the above, it is an object of the present invention to overcome the limitations of the prior art.

An object of the present invention is to provide a lubricant for a magnetic recording medium that avoids degradation of the lubricant and abrasion of the protection layer caused by low levitation of the magnetic head in high density recording.

A further object is to provide a magnetic recording medium having stable lubricant quality (improvement of CSS durability) over the long term.

A further object is to provide a method for making a magnetic recording medium, where the medium possesses stable lubricant quality.

In order to achieve the above objectives, the present inventors have conducted intensive study into a lubricant used in a lubrication layer. As a result, a compound having a cyclic triphosphazene lubricant and a perfluoropolyether lubricant in a single molecule was discovered. The composition of the present invention improves lubrication quality and is highly effective in suppressing degradation of the perfluoropolyether lubricant.

Briefly stated, the present invention is a lubricant for a magnetic recording medium that imparts resistance to degradation, improved lubrication quality and better CSS durability to the medium, even when using a low levitating head. The lubricant is a perfluoropolyether compound having a cyclic triphosphazene end group within the molecule.

The above perfluoropolyether lubricant has a general structural formula (I):

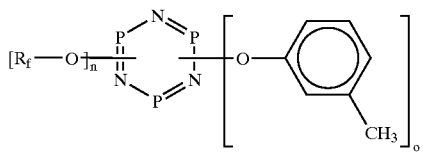

wherein n is an integer from 1 to 5, o is an integer from 1 to 5, provided that n+o≦6. $R_f$ is selected from the group consisting of:

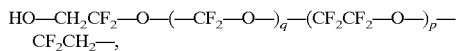

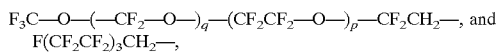

wherein p is 0 or an integer of 1 or greater and q is 0 or an integer of 1 or greater.

The perfluoropolyether lubricant of the present invention can be formed by a dip coat method, a spin coat method, and the like.

According to an embodiment of the invention, a magnetic recording medium is provided which uses a perfluoropolyether compound having a cyclic triphosphazene end group within the molecule as a lubricant. The magnetic recording medium has the sequential layers of a foundation layer, a magnetic layer, a protection layer, and a lubrication layer on a non-magnetic base. The lubrication layer includes at least one perfluoropolyether lubricant having a cyclic triphosphazene end group within the molecule.

According to another embodiment of the invention, a method of making a magnetic recording medium which resists degradation when using a low levitation head, is provided, including the sequential steps of: forming a foundation layer on a non-magnetic base, forming a magnetic layer on the foundation layer, forming a protection layer on the magnetic layer, forming a lubrication layer on the protection layer. The lubrication layer includes at least one perfluoropolyether lubricant having a cyclic triphosphazene end group within the molecule.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
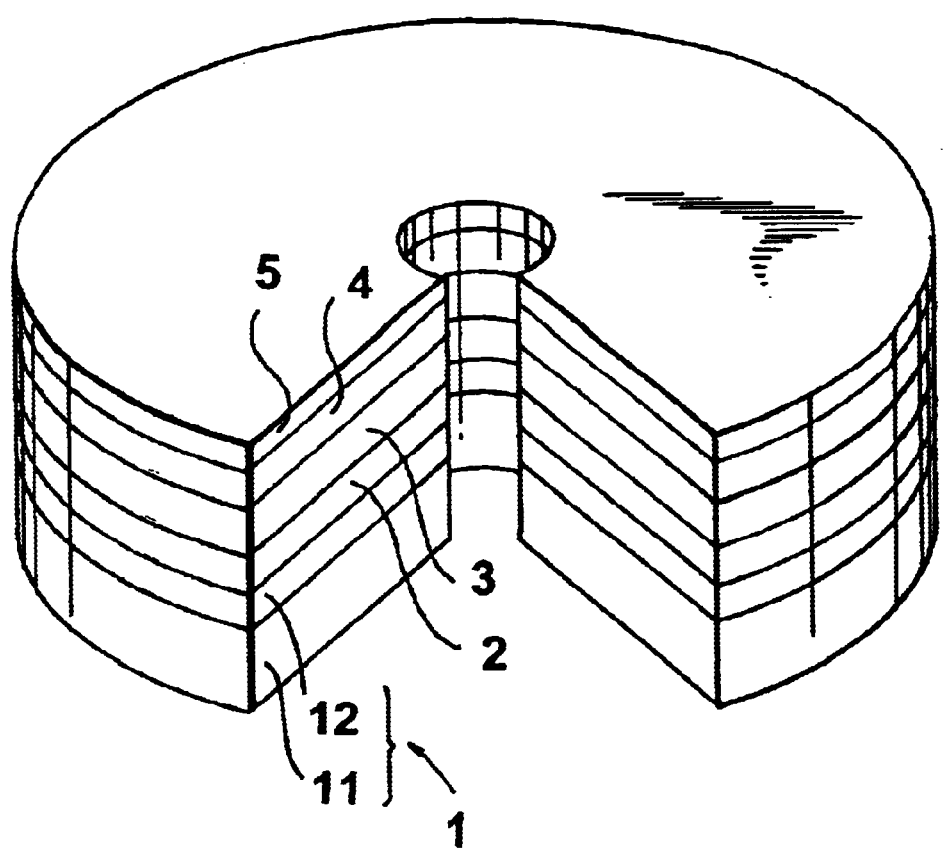
FIG. 1 is a cross-sectional view of one embodiment of a magnetic recording medium based on the present invention.

In the magnetic recording medium of the present invention, a perfluoropolyether lubricant having a cyclic triphosphazene end group within the molecule, is used in a lubrication layer in order to improve the lubrication quality of the surface of the magnetic recording medium. The perfluoropolyether lubricant has the following general structural formula (I):

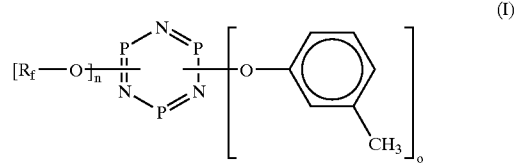

wherein n is an integer from 1 to 5, o is an integer from 1 to 5, and n+o<6. $R_f$ is selected from the group consisting of:

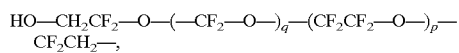

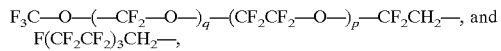

wherein p is 0 or an integer of 1 or greater and q is 0 or an integer of 1 or greater.

A preferred embodiment of the perfluoropolyether lubricant of the present invention has the following general structural formula (II):

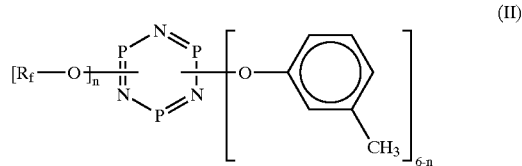

wherein n is an integer from 1 to 5, and $R_f$ is selected from the group consisting of:

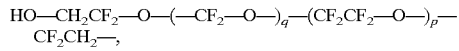

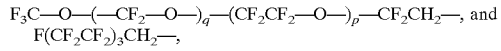

wherein p is 0 or an integer of 1 or greater and q is 0 or an integer of 1 or greater.

The perfluoropolyether lubricants of the present invention can be used alone or in combination. The lubrication layer can be a single layer or can have multiple layers. In addition, the lubricants can be diluted with an appropriate solvent as needed. A concentration of 0.05 weight % is suitable. The lubricant can be coated using known methods. Preferably, the dip coat method or spin coat method is used.

Using the perfluoropolyether lubricant of the present invention to completely cover the surface of the magnetic recording medium prevents sorption of pollutants and improves lubrication quality. As a result, a magnetic recording medium with excellent CSS durability can be obtained.

SYNTHESIS EXAMPLE

The perfluoropolyether liquid lubricant of the present invention can be made by the following embodiments. However, the present invention is not limited to these, and may be obtained by other methods known to those skilled in the art.

The perfluorpolyether lubricant having a cyclic triphosphazene end group within the molecule, represented by structural formula (I) or (II), can be used alone or in combination. The lubrication layer can be either a single layer of have multiple layers. In addition, the lubricants can be diluted with an appropriate solvent as needed. A concentration of 0.05 weight % is suitable. The coating of the lubricant can be performed by known methods. Preferably, the dip coat or spin coat method is used.

Embodiments

Exemplary methods for synthesizing the perfluoropolyether liquid lubricant of the present invention are given below. It is to be understood that these are examples of suitable methods, however the invention is not limited to the examples.

(a) Sodium Alkoxide Formation

One (1.0) g of sodium metal was added to 30 ml of HFE 7200 (3M Corp.), which had been dehydrated well through distillation. This mixture was added to a solution of 10 g of perfluoropolyether lubricant (for example Fomblin Z-DOL of Audimont Corp.) and 0.1 g of pyridine dissolved in 80 ml of HFE7200, and then cooled to 0° C. The solution was maintained at a temperature of 0° C. or below and stirred for 10 hours. The perfluoropolyether alkoxide end point was confirmed by NMR.

The resulting solution was filtered. The solid part was removed and then washed with pure water. The HFE7200 was removed, to obtain 8.0 g of the desired perfluoropolyether alkoxide.

(b) Sodium Phenoxide Formation

One (1.0) g of sodium metal was added to 30 ml of diethyl ether, which had been dehydrated well through distillation. This mixture was added to a solution of 10 g of m-methyl fluorophenol and 0.1 g of pyridine dissolved in 80 ml of diethyl ether, and cooled to 0° C. The solution was maintained at a temperature of 0° C. or below and stirred for 5 hours. The m-methylfluoro-sodium phenoxide end point of the reaction was confirmed by NMR.

The resulting solution was filtered. After removing the solid part, the filtrate was washed with pure water, and diethyl ether was removed, to obtain 8.5 g of the desired m-methylfluoro-sodium phenoxide.

(c) Synthesis of Triphosphazene Modified Perfluoropolyether

Two (2.0) g of perfluoropolyether alkoxide obtained in (a) and 6.0 g of m-methyl fluoro-sodium phenoxide obtained in (b) and 3.0 g of hexachlorophosphazene $N_3P_3Cl_6$ and 50 ml of HFE7200 were placed in an autoclave. After N2 displacement, the mixture was reacted for 200 hours at 90° C. The endpoint of the reaction was confirmed by NMR. This was washed with water and ethanol. 2.2 g of the desired perfluoropolyether, which has a triphosphazene at the end of the chain molecule, was obtained.

One embodiment of a magnetic recording medium of the present invention is shown in FIG. 1. Referring to FIG. 1, a magnetic recording medium of the present invention, is illustrated. There is a non-magnetic base 1, comprising a non-magnetic substrate 11 (for example, Al—Mg) and a non-magnetic metal layer 12 (for example, Ni—P formed by electroplating of NI—P on top of the alloy substrate); a non-magnetic metal foundation layer 2 if formed on top of non-magnetic base 1; a magnetic layer 3 of a ferromagnetic alloy (for example Co—Cr—Ta, Co—Cr—Pt, and the like) is formed as a thin film on top of metal foundation layer 2; and protection layer 4 (for example, DLC) is formed on top of magnetic layer 3. There is a lubrication layer 5, as described previously, formed on protection layer 4.

The following are examples of making a magnetic recording medium of the present invention. However, the present invention is not limited to these examples.

1. Making a Magnetic Recording Medium

Embodiment 1

A 13 micrometer non-magnetic metal layer was formed by electroplating Ni—P on top of an Al—Mg alloy substrate. After using diamond slurry to polish the surface to achieve a surface roughness Ra of 10 Å, concentric grooves were made through texture processing, resulting in a surface roughness Ra of 40 Å. After washing the resulting base, a 500 Å thick non-magnetic metal foundation layer of Cr, followed by a 300 Å thick magnetic layer of Co—Cr—Ta, and additionally a 150 Å protection layer of DLC, were deposited in order onto the non-magnetic metal layer, using the DC spatter method.

A lubricant of a perfluoropolyether according to the general formula (II) as described above, wherein:

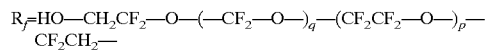
$R_f$=HO—$CH_2CF_2$—O—(—$CF_2$—O—)$_q$—($CF_2CF_2$—O—)$_p$—$CF_2CH_2$— was prepared to a concentration of 0.05 wt % by dilution with a fluorocarbon solvent, HFE-7100 (3M Corp.). This lubricant solution was coated onto the protection layer using the dip coating method to make a magnetic recording medium having a 20 Å thick lubrication layer.

Embodiment 2

A magnetic recording medium was made in the same manner as in Embodiment 1, except that instead of the lubricant used in Embodiment 1, a perfluoropolyether lubricant according to general formula (II), wherein:

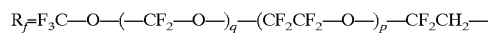
$R_f$=$F_3C$—O—(—$CF_2$—O—)$_q$—($CF_2CF_2$—O—)$_p$—$CF_2CH_2$— was used.

Embodiment 3

A magnetic recording medium was made in the same manner as in Embodiment 1, except that instead of the lubricant used in Embodiment 1, a perfluoropolyether lubricant according to general formula (II) wherein:

$R_f$=F($CF_2CF_2$)$_3CH_2$— was used.

Comparative Example 1

A magnetic recording medium was made in the same manner as in Embodiment 1, except that instead of the lubricant used in Embodiment 1, Fomblin Z-dol 4000 (product name, Audimont Corp.), which is a perfluoropolyether having a hydroxyl group as the end group, was used.

2. Evaluation of the Magnetic Recording Media

Two evaluations of degradation were conducted on the lubrication layers on the surface of each of the magnetic recording media created in the Embodiments 1–3 and Comparative example 1 described above.

Evaluation 1

One drop of a mixture of $Al_2O_3$—TiC powder and ultrapure water was placed onto the surfaces of the various magnetic recording media created in Embodiments 1–3 and Comparative example 1. Next, the magnetic recording media were left for 24 hours inside a desiccator at 80° C. and 80% relative humidity. Using a Fourier transform infrared (FT-IR) spectrophotometer, the presence or absence of degradation of the lubricant on the surface of the magnetic recording media was confirmed. These results are shown in Table 1 below.

Evaluation 2

One drop of ultrapure water was placed on top of the surfaces of the various magnetic recording media manufactured in Embodiments 1–3 and Comparative example 1. These media and a petri dish containing 10 cc of 1% $H_2SO_4$ were placed inside a desiccator and left for 24 hours under conditions of 80 degrees and 80% relative humidity. Next, using a Fourier transform infrared (FT-IR) spectrophotometer, the presence or absence of degradation of the lubricant on the surface of the magnetic media was confirmed. These results are shown in Table 1.

TABLE 1

Results of evaluation of degradation of lubricant

| | Presence of degradation | |
|---|---|---|
| | Evaluation 1 | Evaluation 2 |
| Embodiment 1 | ○ | ○ |
| Embodiment 2 | ○ | ○ |
| Embodiment 3 | ○ | ○ |
| Comparative example 1 | X | X |

Key:
○ = no degradation present
X = degradation present

Referring to Table 1, for both Evaluation 1 and Evaluation 2, it is clear that degradation of the lubricant was not seen in magnetic recording media (Embodiments 1–3) having a perfluoropolyether lubricant of the present invention in the lubricant layer. On the other hand, degradation was confirmed in the lubricant of Comparative example 1.

Next, Evaluations 3 and 4 test the lubrication quality of the magnetic recording media created in Embodiments 1–3 and Comparative example 1 as described above.

Evaluation 3

A magnetic head with a head load of 3.5 gf was slid at a rotation speed of 1 rpm at a radius position of 18.5 mm on top of the surface of the various magnetic recording media of Embodiments 1–3 and Comparative example 1. The kinetic friction coefficient $\mu_I$ was measured at this time. Next, the kinetic friction coefficient $\mu_L$ was measured while the head was sliding at a rotation speed of 100 rpm. These results are shown in Table 2.

Evaluation 4

The various magnetic recording media created in Embodiments 1–3 and Comparative example 1 were built into real magnetic disk drives using the same head as in Evaluation 3. The initial friction coefficient $\mu_I$ was measured. Next, under conditions of 1. normal temperature and humidity (25° C. and 50% relative humidity) and 2. elevated temperature and humidity (60° C. and 80% relative humidity), CSS was cycled 20,000 times. Afterwards, the friction coefficient $\mu_L$ was measured. In addition, when CSS was repeated 20,000 times under conditions of 60° C. and 80% relative humidity, the presence or absence of soiling of the head was observed with an optical microscope. These results are shown in Table 2.

TABLE 2

Measurement results for kinetic friction coefficient, friction coefficient with CSS and head soiling

| | Normal temperature/ Normal humidity | | | | 60° C./60% relative humidity | | |
|---|---|---|---|---|---|---|---|
| | Kinetic friction coefficient $\mu_1$ | Kinetic friction coefficient $\mu_1$ | Kinetic friction coefficient $\mu_1$ | Kinetic friction coefficient $\mu_1$ | Kinetic friction coefficient $\mu_1$ | Kinetic friction coefficient $\mu_1$ | Head soiling |
| Emb. 1 | 0.32 | 0.40 | 0.31 | 0.34 | 0.40 | 0.50 | ○ |
| Emb. 2 | 0.35 | 0.44 | 0.32 | 0.35 | 0.37 | 0.45 | ○ |
| Emb. 3 | 0.38 | 0.43 | 0.35 | 0.38 | 0.38 | 0.47 | ○ |
| Comp. Ex. I | 0.30 | 0.55 | 0.30 | 0.59 | 0.40 | 0.77 | X |

As can be seen from Table 2, the magnetic recording media having the protective layer coated with the perfluoropolyether lubricant of the present invention, has a small initial friction coefficient $\mu_I$ under both conditions. The rise in the friction coefficient with 20,000 times of CSS was also small. In contrast, in Comparative example 1, the friction coefficient rose after 20,000 times of CSS. In addition, there was abrasion on the protection layer of Comparative example 1. Thus, by using the lubricant of the present invention, the sliding quality and CSS durability of the magnetic recording medium is improved.

In addition, there was no detectable head soiling in the magnetic recording media coated with the lubricant of the present invention. In contrast, head soiling occurred in Comparative example 1.

As is clear from the above evaluations, using the perfluoropolyether lubricant of the present invention, prevents transfer of lubricant or lubricant degradation products from the surface of the magnetic disk to the magnetic head. In addition, abrasion of the protection layer during high speed rotation is prevented. As a result, compared to the prior art, the present invention results in a magnetic recording medium having excellent stability of the lubrication layer over long term use.

Having described preferred embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A magnetic recording medium comprising in sequential order:

a non-magnetic base;

a foundation layer;

a magnetic layer;

a protection layer; and a lubricant layer;

said lubricant layer comprising at least one perfluoropolyether lubricant having the following general structural formula (I):

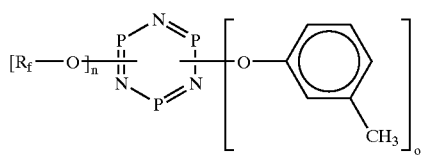
(I)

wherein n is an integer $\geq 1$, o is an integer $\geq 1$, provided that n+o=6; and
$R_f$ is selected from the group consisting of:

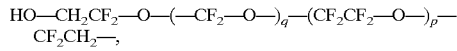

wherein p is 0 or an integer of 1 or greater, and q is 0 or an integer of 1 or greater.

2. A magnetic recording medium according to claim 1, wherein said p is an integer from 1 to 5 and said q is an integer from 1 to 5.

3. A method of making a magnetic recording medium, comprising the sequential steps of:

forming a foundation layer on a non-magnetic base;
forming a magnetic layer on said foundation layer;
forming a protection layer on said magnetic layer;
forming a lubrication layer on said protection layer;
wherein a perfluoropolyether lubricant is formed on said protection layer using a dip coat method or a spin coat method; and
wherein said perfluoropolyether lubricant has the following general formula (II):

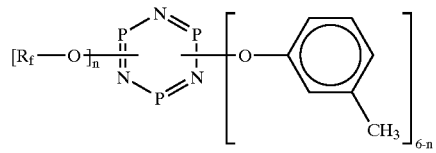
(II)

wherein n is an integer from 1 to 5; and
$R_f$ is selected from the group consisting of:

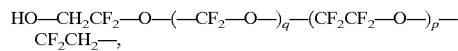

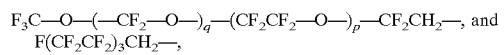

wherein p is 0 or an integer of 1 or greater, and q is 0 or an integer of 1 or greater.

4. A method of making a magnetic recording medium according to claim 3, wherein said p is an integer from 1 to 5 and said q is an integer from 1 to 5.

* * * * *

UNITED STATES PATENT AND TRADEMARK OFFICE
CERTIFICATE OF CORRECTION

PATENT NO. : 6,730,403 B1
APPLICATION NO. : 09/479285
DATED : May 4, 2004
INVENTOR(S) : Shinji Shirai et al.

It is certified that error appears in the above-identified patent and that said Letters Patent is hereby corrected as shown below:

In column 3, figure 1, delete

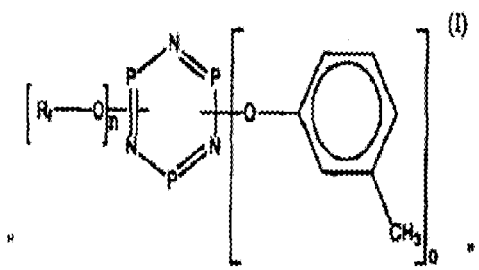

and insert

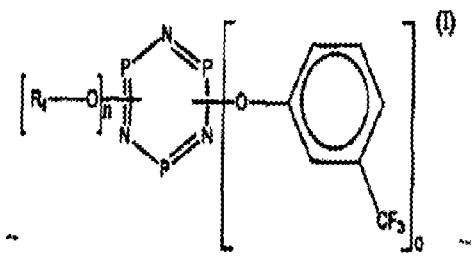

In column 4, figure 1, delete

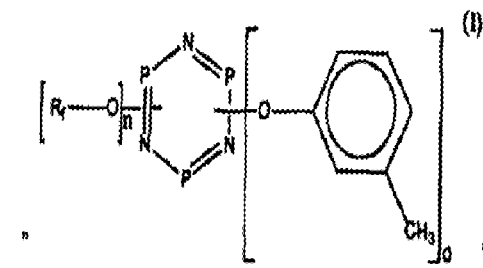

UNITED STATES PATENT AND TRADEMARK OFFICE
CERTIFICATE OF CORRECTION

PATENT NO. : 6,730,403 B1
APPLICATION NO. : 09/479285
DATED : May 4, 2004
INVENTOR(S) : Shinji Shirai et al.

Page 2 of 3

It is certified that error appears in the above-identified patent and that said Letters Patent is hereby corrected as shown below:

and insert

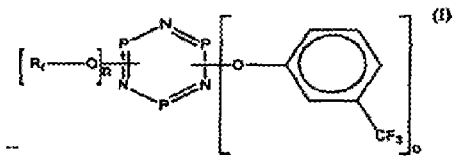

In column 4, figure 2, delete

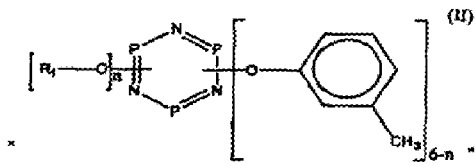

and insert

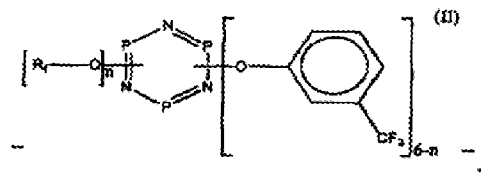

In column 9, figure 1, delete

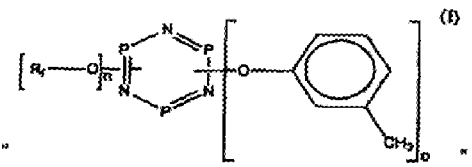

and insert

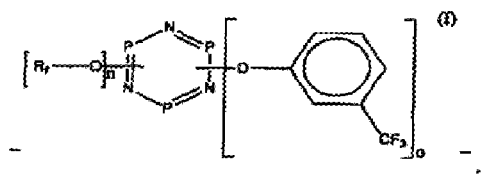

UNITED STATES PATENT AND TRADEMARK OFFICE
CERTIFICATE OF CORRECTION

PATENT NO. : 6,730,403 B1  
APPLICATION NO. : 09/479285  
DATED : May 4, 2004  
INVENTOR(S) : Shinji Shirai et al.

It is certified that error appears in the above-identified patent and that said Letters Patent is hereby corrected as shown below:

In column 10, figure 2, delete

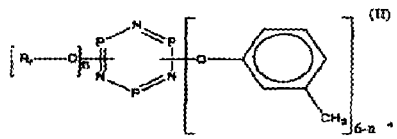

and insert

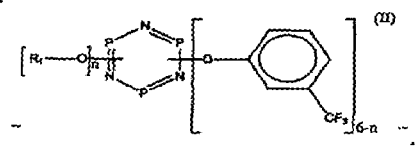

Signed and Sealed this

Fifteenth Day of January, 2008

JON W. DUDAS  
*Director of the United States Patent and Trademark Office*